United States Patent
Dulac

(10) Patent No.: US 8,032,272 B2
(45) Date of Patent: Oct. 4, 2011

(54) METHOD AND DEVICE FOR DETERMINING THE ROTARY STATE OF A VEHICLE WHEEL FITTED WITH AN ACTIVE MOTION SENSOR SUITABLE FOR DELIVERING AN OSCILLATORY OUTPUT SIGNAL DURING A ROTATION OF SAID WHEEL

(75) Inventor: Gilles Dulac, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 973 days.

(21) Appl. No.: 11/949,088

(22) Filed: Dec. 3, 2007

(65) Prior Publication Data

US 2008/0133079 A1  Jun. 5, 2008

(30) Foreign Application Priority Data

Dec. 1, 2006 (FR) ...................................... 06 10510

(51) Int. Cl.
*G01M 17/013* (2006.01)

(52) U.S. Cl. ......... 701/29; 73/660; 73/115.08; 324/160; 324/207.25

(58) Field of Classification Search .................... 73/660, 73/115.07, 115.08, 504.1; 324/160, 163, 324/207.25; 701/29
See application file for complete search history.

(56) References Cited

U.S. PATENT DOCUMENTS

| 3,503,042 | A | 3/1970 | Skinner | |
|---|---|---|---|---|
| 6,002,249 | A | 12/1999 | Futsuhara | |
| 6,549,002 | B2 * | 4/2003 | Ito et al. | 324/207.13 |
| 6,909,278 | B2 * | 6/2005 | Hernitscheck et al. | 324/174 |
| 7,382,118 | B2 * | 6/2008 | Kosaka | 324/160 |
| 7,432,851 | B2 * | 10/2008 | Dulac | 342/173 |
| 2004/0095129 | A1 * | 5/2004 | Furlong | 324/207.2 |
| 2005/0068021 | A1 * | 3/2005 | Mager et al. | 324/207.2 |
| 2005/0206371 | A1 * | 9/2005 | Tsukamoto et al. | 324/207.21 |
| 2006/0043966 | A1 * | 3/2006 | Izawa et al. | 324/207.25 |
| 2006/0097717 | A1 * | 5/2006 | Tokuhara et al. | 324/207.25 |
| 2007/0247144 | A1 * | 10/2007 | Tokuhara et al. | 324/207.25 |

FOREIGN PATENT DOCUMENTS

| GB | 2 186 979 A | 8/1987 |
|---|---|---|
| GB | 2 357 847 A | 7/2001 |

* cited by examiner

*Primary Examiner* — Ruth Ilan
(74) *Attorney, Agent, or Firm* — Young & Thompson

(57) ABSTRACT

A method of determining the rotary, rotationally immobile or mobile, state of a vehicle wheel, according to which the signal delivered by an active motion sensor fitted to the wheel is analyzed instantly according to a procedure consists, firstly, at time t1, in connecting the motion sensor to an analog circuit including at least one capacitor and interposed between the motion sensor and a first input of an electronic comparison element, so as to store in the capacitor reference value V1 representing the value of the signal at t1. Thereafter, the motion sensor is connected to a second input of the comparison element, to compare V1 with a value V2 representing the value of the signal at time t2, and to deliver a diagnostic signal representing either a rotationally immobile state of the wheel when V1=V2, or a rotationally mobile state of the wheel when V1≠V2.

6 Claims, 2 Drawing Sheets

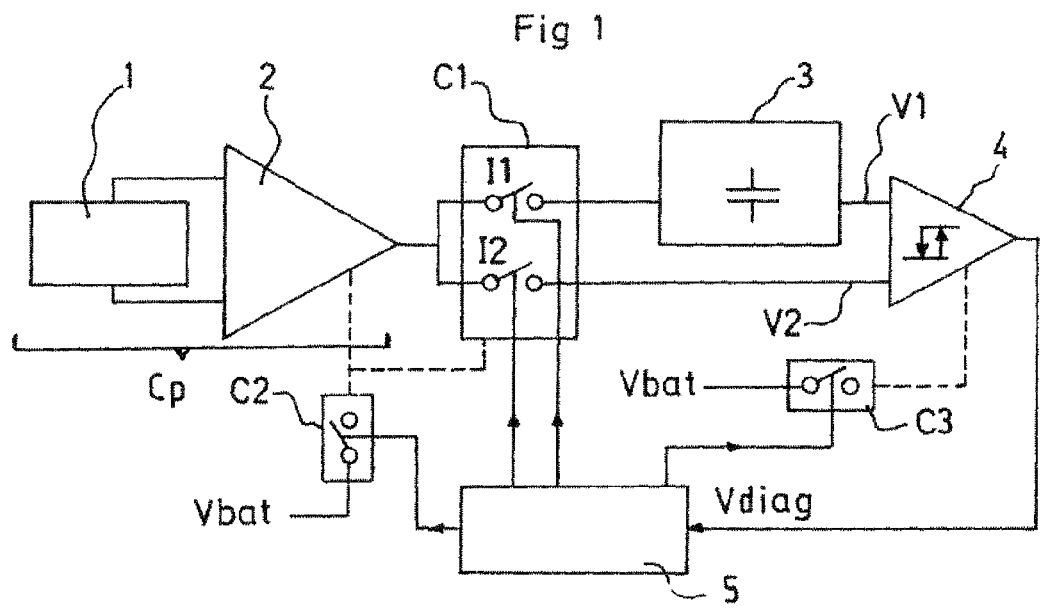
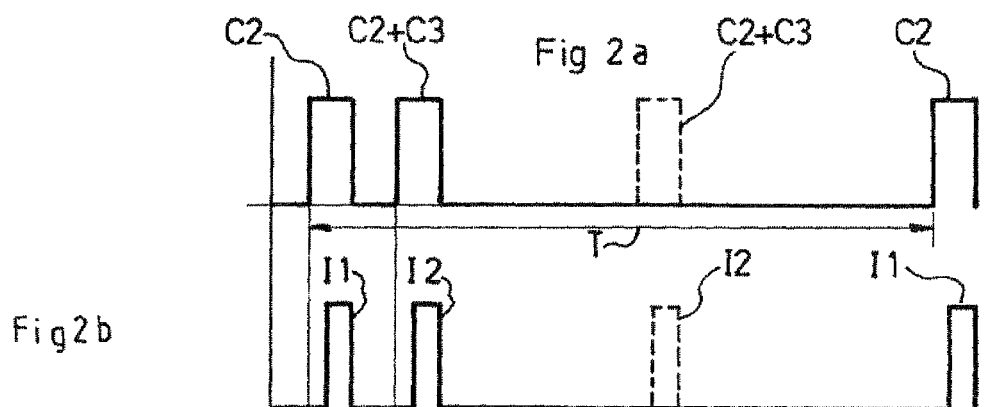
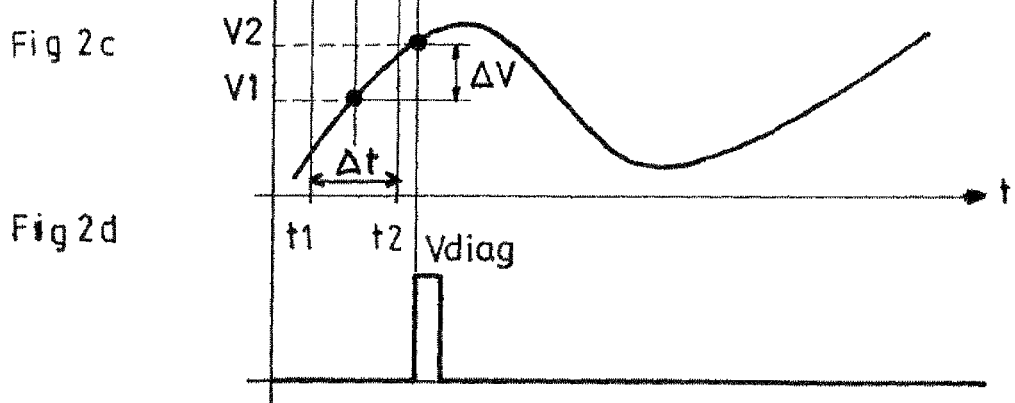

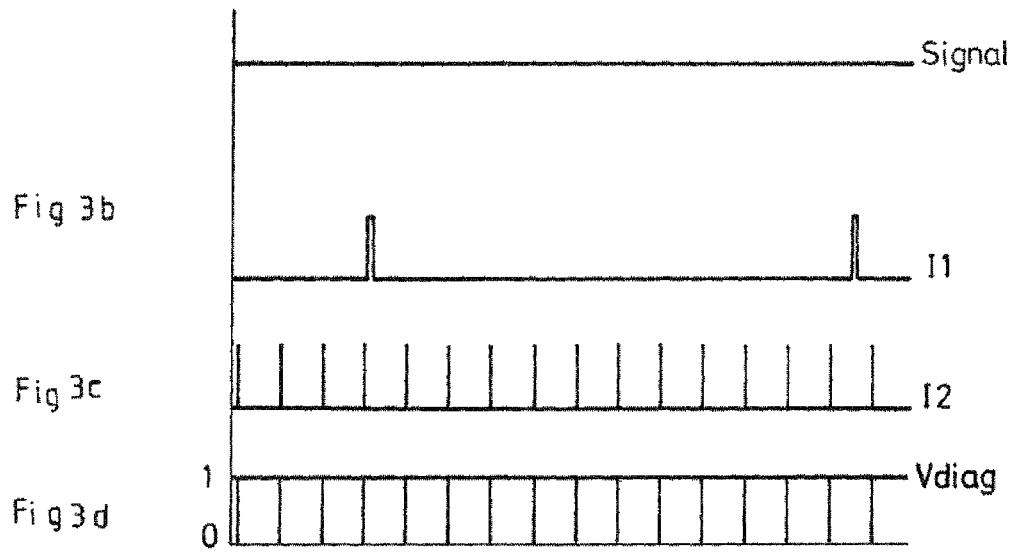
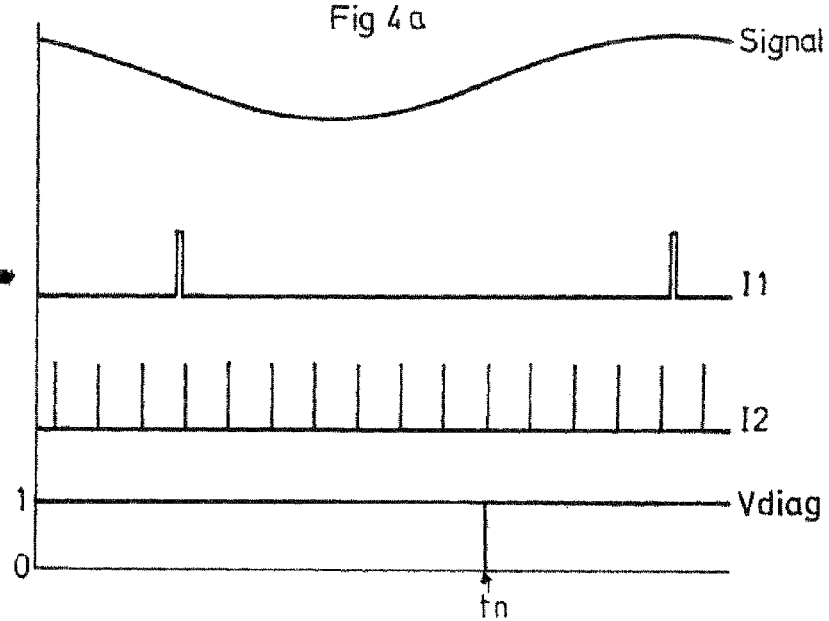

METHOD AND DEVICE FOR DETERMINING THE ROTARY STATE OF A VEHICLE WHEEL FITTED WITH AN ACTIVE MOTION SENSOR SUITABLE FOR DELIVERING AN OSCILLATORY OUTPUT SIGNAL DURING A ROTATION OF SAID WHEEL

FIELD OF THE INVENTION

The invention relates to a method and a device for determining the rotary, rotationally immobile or mobile, state of a vehicle wheel fitted with an active motion sensor suitable for delivering an oscillatory output signal during a rotation of said wheel. By way of examples of motion sensors to which the invention is specifically directed, mention may be made of impact sensors, magnetic sensors for detecting variations in the terrestrial magnetic field, termed "EMF" (Earth Magnetic Field) sensors, or tangential accelerometers.

BACKGROUND OF THE INVENTION

More and more motor vehicles are possessing systems for monitoring and/or measuring parameters comprising sensors mounted on said vehicle.

By way of example relating to such systems, mention may be made of monitoring systems comprising sensors fitted to each of the wheels of vehicles, dedicated to measuring parameters, such as pressure and/or temperature of the tires mounted on these wheels, and intended to inform the driver of any abnormal variation in the measured parameter.

These monitoring systems conventionally comprise:
mounted on each of the wheels of the vehicle, an electronic housing incorporating the measurement sensors, a microprocessor, a radio frequency emitter and a button battery,
and, mounted on the vehicle, a central unit for receiving the signals emitted by the electronic housings, equipped with a computer incorporating a radiofrequency receiver connected to an antenna.

Moreover, usually, these monitoring systems comprise a displacement sensor suitable for being incorporated into each electronic housing and intended to provide information representative of the rotary, rotationally immobile or mobile, state of the wheel, and hence representative of the state of displacement of the vehicle (stationary or rolling).

Such information makes it possible, among other things, to institute two modes of operation of the monitoring systems determining an "awake" state and an "awoken" state of the electronic housings. These two modes of operation are differentiated in particular by the frequency of emission of the signals output by the electronic housings, and are adapted in such a way that this emission frequency is reduced when the electronic housings are in an "awake" state corresponding to the stationary state of the vehicle.

This management of the emission frequency of the signals emitted by the electronic housings leads, in fact, when the vehicle is stationary, to reducing, on the one hand, the consumption of the batteries energizing the onboard microprocessors, and on the other hand, the "pollution" of the environment surrounding the vehicle, and consequently, in particular, the risks of parasitic interference between close vehicles.

The first family of displacement sensors conventionally used for the aforesaid purposes consists of sensors of the accelerometer type whose output signal varies linearly as a function of the speed of rotation of the wheel.

An essential advantage of such sensors lies in the fact that they turn out to lead to low electrical energy consumption, a paramount quality in view of the necessary requirements, in particular regarding lifetime, which the batteries incorporated in the electronic housings must satisfy. Specifically, the response curve of these sensors as a function of the speed of rotation of the wheels being linear, the determination of the rotary state of a wheel entails simply fixing a rolling threshold, and activating the associated sensor instantly for a time of small duration, so as to achieve the comparison of the value of the signal delivered with the rolling threshold.

On the other hand, such sensors exhibit two major drawbacks residing, on the one hand, in their high retail cost, and on the other hand, in their relative fragility in view of the conditions of use.

The second family of displacement sensors conventionally used for the purpose of determining the rotary state of the wheels of vehicles consists of sensors whose output signal exhibits a waveform of variable amplitude, for example sinusoidal, and synchronous with the speed of rotation of the wheel. Such sensors, of the type of impact sensors, magnetic sensors for detecting variations in the terrestrial magnetic field, termed "EMF" sensors, tangential accelerometers, turn out to have a lower retail price and greater robustness relative to those of the sensors of the first family mentioned above.

On the other hand, the current solutions implemented to ensure the processing of the signal delivered by such sensors with a view to determining the rotary state of a wheel turn out to involve significant electrical energy consumption.

The first solution, of the analog type, which consists in using systems of amplifiers and of comparators, makes it necessary, in particular on account of problems of average value, hysteresis, etc., to energize these components for a duration corresponding to the time required for the wheel to perform a revolution at low speed (detection of the starting of the vehicle). Now, such a duration turns out to be very detrimental within the framework of the use of a button battery.

The second solution, of the digital type, which consists in using a conversion system comprising a filter and an analog/digital converter, demands a set-up time equivalent to that of the analog solution, hence likewise very detrimental within the framework of the application to which the invention is directed.

SUMMARY OF THE INVENTION

The present invention is directed at alleviating this electrical consumption drawback related to the use of sensors whose output signal exhibits a waveform of variable amplitude, and its main objective is to provide a solution leading to an appreciable reduction in the consumption generated by such sensors during a procedure for determining the rotary state of wheels of vehicles.

For this purpose, the invention is directed, firstly, at a method of determining the rotary, rotationally immobile or mobile, state of a vehicle wheel, according to which the wheel is fitted with an active motion sensor suitable for delivering an oscillatory output signal during a rotation of said wheel, and said output signal is analyzed instantly so as to deduce from its form the rotary state of the wheel.

According to the invention, each instant analysis of the output signal delivered by the motion sensor consists:
A) firstly, at an instant t1, in connecting the motion sensor to an analog circuit, termed the storage circuit, comprising at least one capacitor, and interposed between said motion sensor and a first input of electronic comparison means, and in electrically energizing the motion sensor in such a way as to store in the capacitor a value V1, termed the reference value, representative of the value of the output signal delivered by the motion sensor at the instant t1, then B), at at least one instant t2=t1+Δt, with Δt predetermined time span, in connecting the motion sensor to a second input of the comparison means, and in electrically energizing said motion sensor and said comparison means, in such a way as to compare the reference value V1 with a value V2 representative of the value of the output signal delivered by the motion sensor at the instant t2, and to deliver a diagnostic signal representative:

of a rotationally immobile state of the wheel when V1=V2, of a rotationally mobile state of the wheel when V1≠V2.

Firstly according to the invention, the expression "active sensor" is understood to define a sensor suitable for delivering a usable signal, that is to say, usually, a sensor comprising a measurement cell and means for amplifying the signal delivered by this measurement cell.

Moreover, usually, the equality "V1=V2" is understood to define, apart from perfect equality, an equality which builds in the conventional tolerances related to the various dispersions in the measurements.

The invention therefore lies in a solution of analog type consisting in storing reference values in a capacitor, then in comparing these reference values with values measured subsequently, so as to deduce directly from these comparisons the rotary state of the wheel, by applying the following principle related to the form of the signal delivered by the sensors:

in the absence of rotation of the wheel, the signal delivered by the sensor does not undergo variations, so that the comparison of values that is performed according to the method of the invention culminates in an equality of the values compared, during a rotation of the wheel, the signal delivered by the sensor consists of an oscillatory signal, so that two successively measured values turn out to be different.

Consequently, a procedure for determining the rotary state of a wheel entails simply:

energizing the sensor instantly with a view to acquiring the values V1 and V2, and energizing the comparison means instantly with a view to comparing the values V1 and V2 and to transmitting the diagnostic signal.

Such a principle thus leads to an optimal decrease in the electrical energy consumption generated by sensors suitable for delivering an oscillatory output signal, during a procedure for determining the rotary state of vehicle wheels.

By way of comparative example, directed at two installations having equivalent objectives:

a standard system of the digital type generates consumption of the order of 12 mA for 1 ms, a system according to the invention generates consumption of less than 0.4 mA for 1 ms.

According to an advantageous embodiment of the invention, each instant analysis of the output signal delivered by the motion sensor consists in storing a reference value V1, and then in successively repeating step (B) n times, with n>1.

This arrangement makes it possible to reduce the energy consumption because it leads to a reduction in the number of measurements of the reference value. Moreover, it makes it possible to carry out different strategies based on different values of the variable "n", with a view to guarding against parasitic measurements resulting for example from electromagnetic disturbances, etc.

The invention extends to a device for determining the rotary, rotationally immobile or mobile, state of a vehicle wheel fitted with an active motion sensor suitable for delivering an oscillatory output signal during a rotation of said wheel. According to the invention, this device comprises:

an analog circuit, termed the storage circuit, linked to the motion sensor, and comprising a breaker and at least one capacitor, electronic comparison means comprising a first input linked to the storage circuit, and a second input linked to the motion sensor with interposition, between the latter and said second input, of a breaker, members for electrically connecting the motion sensor, the breakers and the comparison means to a current source, and a management unit programmed to control instant analyses of the output signal delivered by the motion sensor, in the course of each of which:

firstly, at an instant t1, it instructs the closure of the breaker of the storage circuit and the electrical energizing of the motion sensor, in such a way as to store in the capacitor a value V1, termed the reference value, representative of the value of the output signal delivered by the motion sensor at the instant t1, then, at at least one instant t2=t1+Δt, with Δt predetermined time span, it instructs the closure of the breaker interposed between the motion sensor and the second input of the comparison means, and the electrical energizing of said motion sensor and of said comparison means, in such a way as to compare the reference value V1 with a value V2 representative of the value of the output signal delivered by the motion sensor at the instant t2, and to obtain at the output of the comparison means a diagnostic signal representative:

of a rotationally immobile state of the wheel when V1=V2, of a rotationally mobile state of the wheel when V1≠V2.

Moreover, advantageously, the electrical connection members comprise a first switch for controlling the electrical energizing of the motion sensor and of the breakers, and a second switch for controlling the electrical energizing of the comparison means.

This arrangement which provides for independent energizing of the comparison means makes it possible to optimize the overall electrical consumption.

Additionally, the comparison means comprise two comparators for detecting, respectively, variations (V1−V2)>0 and (V1−V2)<0.

BRIEF DESCRIPTION OF THE DRAWINGS

Other characteristics, aims and advantages of the invention will emerge from the detailed description which follows with reference to the appended drawings which represent by way of nonlimiting example thereof a preferential embodiment. In these drawings:

FIG. 1 is a functional diagram of a device according to the invention for determining the rotary state of a wheel, FIGS. 2a to 2d are graphs on which are represented the various control signals (FIGS. 2a and 2b), and the corresponding output signals (FIGS. 2c and 2d), FIGS. 3a to 3d are graphs representing a readout of measurements corresponding to a rotationally immobile state of a wheel, and FIGS. 4a to 4d are graphs representing a readout of measurements corresponding to a rotationally mobile state of a wheel.

DETAILED DESCRIPTION OF THE INVENTION

The device according to the invention, represented by way of example in FIG. 1, consists of a device for determining the rotary, rotationally immobile or mobile, state of a vehicle wheel, comprising an active motion sensor Cp consisting of a measurement cell 1 and of an amplifier 2, which is suitable for delivering an oscillatory output signal during a rotation of said wheel.

This determining device comprises, furthermore, according to the invention:
- a switch C1 incorporating two breakers I1 and I2 connected in parallel at the output of the amplifier 2 of the motion sensor Cp,
- a capacitor 3 mounted in series with the breaker I1, so as to form with the latter a so-called storage circuit for storing a reference voltage V1,
- electronic comparison means 4 comprising a first input linked to the capacitor 3, a second input linked to the breaker I2, and an output linked to a microprocessor calculation unit 5,
- a switch C2 for electrically connecting the motion sensor Cp and the switch C1 to a current source (not represented) delivering a voltage Vbat,
- and a switch C3 for electrically connecting the comparison means 4 to the current source.

Moreover, the comparison means are suitable for delivering, in a conventional manner, a signal Vdiag representative if either of an equality between the values of the voltages at the level of the first and second input (in the example Vdiag=0), or of a positive or negative difference between these two voltage values (in the example Vdiag=1). For this purpose, these comparison means 4 may consist of two comparators dedicated, respectively, one to the positive differences and the other to the negative differences.

Finally, the calculation unit 5 is linked to the breakers of the switch C1, and to the switches C2 and C3, in such a way as to control the changes of state of said breakers and switches.

According to the invention, this calculation unit is, additionally, programmed to institute a procedure for analyzing the signals delivered by the motion sensor Cp, consisting chronologically, with a predetermined polling period T, and such as represented in FIGS. 2a, 2b and 2d illustrating the analysis of a signal represented in FIG. 2c, obtained with a rotary wheel:

1/ at a first instant t1, on the one hand, in instructing the closure of the switch C2 (FIG. 2a) in such a way as to energize the motion sensor Cp and the switch C1, and on the other hand, in instructing the closure of the breaker I1 (FIG. 2b) in such a way as to store in the capacitor 3 a reference voltage V1 (FIG. 2c), representative of the value of the output signal delivered by the motion sensor Cp at the instant t1, 2/ in instructing the opening of the switch C2 at an instant t1+$\epsilon$, 3/ at an instant t2=t1+$\Delta$t, with $\Delta$t predetermined time span of the order of a few tens of milliseconds and such that $\Delta$t>>$\epsilon$, on the one hand, in instructing the closure of the switches C2 and C3 (FIG. 2a) in such a way as to energize the motion sensor Cp, the switch C1 and the comparison means 4, and on the other hand, in instructing the closure of the breaker I2 (FIG. 2b), in such a way as to compare the reference voltage V1 with a voltage V2 (FIG. 2c) representative of the value of the output signal delivered by the motion sensor Cp at the instant t2, and to obtain the delivery, destined for the calculation unit 5, of a diagnostic signal Vdiag (FIG. 2d) representative:
- of a rotationally immobile state of the wheel when V1=V2,
- of a rotationally mobile state of the wheel when V1≠V2, 4/ in instructing the opening of the switches C2 and C3 at an instant t2+$\epsilon$, 5/ and in beginning a new analysis procedure at an instant t1+T (FIG. 2a).

It should be noted, moreover, as represented dashed in FIGS. 2a and 2b, that steps 3/ and 4/ may be performed n times (twice in the example represented), during one and the same polling period.

These steps are also partially illustrated in FIGS. 3a to 3d and 4a to 4d which represent a procedure according to which n measurements of "V2", (n=11 in the example), each triggered by the closure of the breaker I2 (FIGS. 3c and 4c), are performed between two measurements of "V1" each triggered for their part by the closing of the breaker I1 (FIGS. 3b and 4b).

According to FIG. 3a, the signal output by the motion sensor Cp exhibits a constant value representative of a rotationally immobile state of the wheel, and during each measurement of a voltage V2 (steps 3/ and 4/ and FIG. 3c), the signal Vdiag delivered to the calculation unit 5 exhibits a zero value because V1=V2 (FIG. 3d).

According to FIG. 4a, the signal output by the motion sensor Cp exhibits a sinusoidal form representative of a rotationally mobile state of the wheel, and during each measurement of a voltage V2 (steps 3/ and 4/ and FIG. 4c), the signal Vdiag delivered to the calculation unit 5 exhibits a value equal to 1 because V1≠V2 (FIG. 4d). It should be noted however that, as represented in FIG. 4d, in view of the sinusoidal form of the signal, one of the values V2, in the example the one measured at an instant tn, may be equal to V1 giving rise instantly to the emission of a signal Vdiag=0, which can be easily discriminated.

The device according to the invention therefore does not invoke the current source other than for brief periods (n times "$\epsilon$") during a polling period T, and therefore leads to optimized reduction of the consumption of current required for determining the rotary state of a vehicle wheel.

The invention claimed is:

1. A method of determining the rotary, rotationally immobile or mobile, state of a vehicle wheel, according to which the wheel is fitted with an active motion sensor (Cp) suitable for delivering an oscillatory output signal during a rotation of said wheel, and said output signal is analyzed instantly so as to deduce from its form the rotary state of the wheel, said determining method being characterized in that each instant analysis of the output signal delivered by the motion sensor (Cp) consists:

A) firstly, at an instant t1, in connecting the motion sensor (Cp) to an analog circuit (I1, 3), termed the storage circuit, comprising at least one capacitor (3), and interposed between said motion sensor and a first input of electronic comparison means (4), and in electrically energizing the motion sensor (Cp) in such a way as to store in the capacitor (3) a value V1, termed the reference value, representative of the value of the output signal delivered by the motion sensor (Cp) at the instant t1, then B), at at least one instant t2=t1+$\Delta$t, with $\Delta$t predetermined time span, in connecting the motion sensor (Cp) to a second input of the comparison means (4), and in electrically energizing said motion sensor and said comparison means, in such a way as to compare the reference value V1 with a value V2 representative of the value of the output signal delivered by the motion sensor (Cp) at the instant t2, and to deliver a diagnostic signal representative:

of a rotationally immobile state of the wheel when V1=V2, of a rotationally mobile state of the wheel when V1≠V2.

2. The determining method as claimed in claim 1, characterized in that each instant analysis of the output signal delivered by the motion sensor (Cp) consists in storing a reference value V1, and then in successively repeating step (B) n times, with n>1.

3. A device for determining the rotary, rotationally immobile or mobile, state of a vehicle wheel fitted with an active motion sensor (Cp) suitable for delivering an oscillatory output signal during a rotation of said wheel, characterized in that it comprises:

- an analog circuit (I1, 3), termed the storage circuit, linked to the motion sensor (Cp), and comprising a breaker (I1) and at least one capacitor (3),
- electronic comparison means (4) comprising a first input linked to the storage circuit (I1, 3), and a second input linked to the motion sensor (Cp) with interposition, between the latter and said second input, of a breaker (I2),
- members (C2, C3) for electrically connecting the motion sensor (Cp), the breakers (I1, I2) and the comparison means (4) to a current source,
- and a management unit (5) programmed to control instant analyses of the output signal delivered by the motion sensor (Cp), in the course of each of which:

firstly, at an instant t1, it instructs the closure of the breaker (I1) of the storage circuit (I1, 3) and the electrical energizing of the motion sensor (Cp), in such a way as to store in the capacitor (3) a value V1, termed the reference value, representative of the value of the output signal delivered by the motion sensor (Cp) at the instant t1, then, at at least one instant t2=t1+Δt, with Δt predetermined time span, it instructs the closure of the breaker (I2) interposed between the motion sensor (Cp) and the second input of the comparison means (4), and the electrical energizing of said motion sensor and of said comparison means, in such a way as to compare the reference value V1 with a value V2 representative of the value of the output signal delivered by the motion sensor (Cp) at the instant t2, and to obtain at the output of the comparison means (4) a diagnostic signal representative:

of a rotationally immobile state of the wheel when V1=V2, of a rotationally mobile state of the wheel when V1≠V2.

4. The determining device as claimed in claim 3, characterized in that the electrical connection members comprise a first switch (C2) for controlling the electrical energizing of the motion sensor (Cp) and of the breakers (I1, I2), and a second switch (C3) for controlling the electrical energizing of the comparison means (4).

5. The determining device as claimed in claim 3, characterized in that the comparison means (4) comprise two comparators for detecting, respectively, variations (V1−V2)>0 and (V1−V2)<0.

6. The determining device as claimed in claim 4, characterized in that the comparison means (4) comprise two comparators for detecting, respectively, variations (V1−V2)>0 and (V1−V2)<0.

* * * * *